(12) United States Patent
Frank et al.

(10) Patent No.: US 7,324,599 B2
(45) Date of Patent: Jan. 29, 2008

(54) FREQUENCY CORRECTION FOR A MULTICARRIER SYSTEM

(75) Inventors: Georg Frank, Nuremberg (DE);
Mathias Pauli, Nuremberg (DE); Udo Wachsmann, Schwabach (DE); Peter Schramm, Eching (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 640 days.

(21) Appl. No.: 10/751,120

(22) Filed: Jan. 5, 2004

(65) Prior Publication Data

US 2004/0170227 A1    Sep. 2, 2004

Related U.S. Application Data

(63) Continuation of application No. PCT/EP02/05615, filed on Jul. 4, 2002.

(30) Foreign Application Priority Data

Jul. 4, 2001    (EP) .................................. 01115678

(51) Int. Cl.
*H04K 1/10* (2006.01)
(52) U.S. Cl. .................................... 375/260
(58) Field of Classification Search ................ 375/260,
375/342, 343, 344, 354, 362, 371, 373, 375,
375/376; 370/210, 480; 379/93.01; 455/113
See application file for complete search history.

(56) References Cited

U.S. PATENT DOCUMENTS 5,228,062 A * 7/1993 Bingham .................... 375/344

2002/0101840 A1 * 8/2002 Davidsson et al. ......... 370/330

FOREIGN PATENT DOCUMENTS

EP    0 817 418 A    1/1998
EP    1 049 302 A    11/2000

OTHER PUBLICATIONS

John G. Proakis, "Digital Communications", 4th edition, published on Aug. 2000 (pp. 341-350).*

(Continued)

*Primary Examiner*—David C. Payne
*Assistant Examiner*—Leon Flores
(74) *Attorney, Agent, or Firm*—Nixon & Vanderhye, P.C.

(57) ABSTRACT

In order to correct frequency deviations of signals in a multicarrier system, such as a OFDM-system, the present invention provides a frequency tracker and a method to operate the same. The frequency tracker is based on a decision directed digital phase locked loop exhibiting a predictive character. On the basis of an estimated phase offset for a received signal (signal component, signal symbol) a predicted phase offset is calculated and applied to the signal (signal component, signal symbol). Further, received signals (signal components, signal symbols) are sampled and for each sample a sample phase offset to be corrected is calculated in dependence to the related estimated phase offset to incorporate the predictive character. In particular, the predicted sample phase offsets are calculated as a function of a corresponding predicted phase offset and a measure being indicative of a distance, in the time domain, between a corresponding phase reference point for the predicted phase offset and a phase reference point defined for a specific part of the received signal, preferably for a preceding preamble signal.

34 Claims, 3 Drawing Sheets

OTHER PUBLICATIONS

Luise et al; "Carrier Frequency Acquisition and Tracking for OFDM Systems"; IEEE Transaction on Communications, IEEE Inc., New York, US, vol. 44, No. 11, Nov. 1, 1996, pp. 1590-1598, XP002081217.

Lee et al; "A New Symbol Timing Recovery Algorithm for OFDM Systems"; IEEE Transactions on Consumer Electronics, IEEE Inc., New York, US, vol. 43, No. 3, Aug. 1, 1997, pp. 767-774, XP000742560.

EP Communication mailed Apr. 2, 2007 in corresponding EP application No. 070032362.2.

Luise et al, "Carrier Frequency acquisition and Tracking for OFDM Systems", IEEE Transactions on Communications, IEEE Inc., New York, US, vol. 44, No. 11, Nov. 1, 1996, pp. 1590-1598.

Lee et al, "A New Symbol Timing Recovery Algorithm for OFDM Systems", IEEE Transactions on Consumer Electronics, IEEE Inc., New York, US, vol. 43, No. 3, Aug. 1, 1997, pp. 767-774.

* cited by examiner

FREQUENCY CORRECTION FOR A MULTICARRIER SYSTEM

This application is a continuation of PCT International Application No. PCT/EP02/05615, filed in English on 4 Jul. 2002, which designated the U.S. PCT/EP02/05615 claims priority to EP Application No. 0115678.3 filed 4 Jul. 2001. The entire contents of these applications are incorporated herein by reference.

BACKGROUND OF THE INVENTION

1. Technical Field

The present invention relates to a method and an apparatus for the correction of a frequency offset of signals in a multicarrier system. In particular, the present invention relates to a method and an apparatus for multicarrier signal frequency corrections which implement a prediction of frequency corrections to be carried out for received multicarrier signals or parts thereof. For that purpose, the present invention is further directed to a phase locked loop approach for a decision directed frequency synchronization in multicarrier systems.

2. Discussion of the Prior Art

Various methods for the transmission of digital signals, such as digital video broadcasting (DVB) and digital audio broadcasting (DAB) signals, are known. One method typically used for such transmissions is the orthogonal frequency division multiplexing (OFDM) method wherein a plurality of modulated signal carriers are used to broadcast the signals. Multicarrier modulation schemes as the OFDM are typically used in systems wherein the time dispersion thereof is much greater than the employed bit duration.

The modulated signal carriers are sampled before being transposed in the frequency domain by means of a fast fourier transformation (FFT) for signal separation. Due to frequency differences between transmitters and receivers in such systems, the demodulated signal carriers can exhibit frequency offsets.

Figure 1:
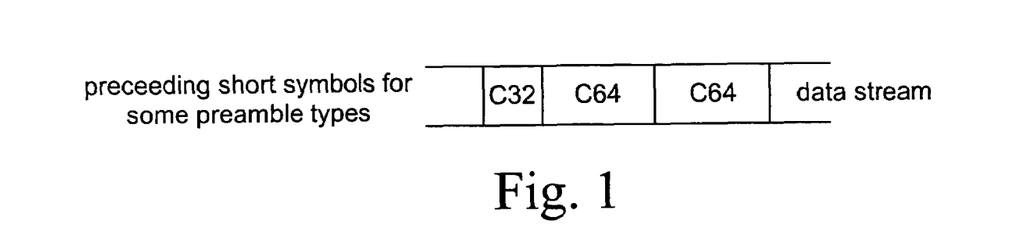
FIG. 1 illustrates the structure of a OFDM C-preamble according to the HIPERLAN/2 standard.

Signal transmission standards, such as the high performance radio local area network type 2 (HIPERLAN/2), use coherent modulation schemes. For an assessment of frequency offsets of received signals and a frequency synchronization to be performed subsequently, so-called preambles are introduced into a data stream of the transmitted signals as training sequence. In case of the OFDM, two identical OFDM symbols (C64) are inserted between a cyclic prefix (C32) and the actual data stream. This so-called C-preamble shown in FIG. 1 is used, e.g. for a channel estimation in the demodulation process of the multicarrier signals.

In particular, the accuracy of signals in the HIPERLAN/2 standard leads to high frequency offsets. As a result, algorithms for a compensation of these frequency offsets have to be implemented. On the basis of the OFDM, usually a frequency correction is done based on an estimation of phase offsets using the C-preamble. The frequency offsets still remaining result in a low performance and require further compensation to correct the remaining frequency offsets.

A common approach for that purpose is to use a frequency tracker employing a phase locked loop (PLL).

Frequency correction means on the basis of first order phase locked loops, such as disclosed in EP 656 706 A2, leave a remaining phase offset for demodulated signals which causes further signal errors upon applying higher order modulation schemes. Here, an improvement can be achieved if measures for a forward phase correction are taken. On the other hand, such a forward phase correction results in a higher complexity for these frequency trackers.

Another approach utilizes second order phase locked loop frequency trackers due to their ability to eliminate remaining phase offsets. A disadvantage of second order phase locked loops is the increased acquisition time leading to error propagations due to the feedback loop. The acquisition time can be reduced by means of increasing the bandwidth of the phase locked loop. In single carrier systems, this results in a low noise suppression. In contrast thereto, in multicarrier systems, e.g. employing the OFDM, the noise suppression due to an increased bandwidth can be achieved by an averaging process in a demodulator for received multicarrier systems.

As disclosed for example in EP 817 418 A1, the demodulator, e.g. a fast fourier transformation means, averages over several subcarriers already leading to a sufficient noise suppression. Therefore, a reduction of the bandwidth is here not required for improving the noise suppression. Since the averaging process in the demodulator requires a block processing structure, a time delay is inherent. This leads to a greater acquisition time.

Common to frequency corrections for multicarrier signals is, beside the correction of the frequency, a derotation of the phase of the signals. This effects that there does not remain a phase offset. Since such feedback loops incorporate a double integration property, a frequency correcting control signal can be applied to received multicarrier signals even when no phase offset is present after a setting time.

Therefore, the object of the present invention is to provide a solution for a frequency correction in a mulitcarrier system which utilizes the benefits of a second order phase locked loop and, in addition, overcomes the problem of a great acquisition time in the prior art.

SUMMARY

The present technology is based on the approach which is exemplary described in the following with respect to the OFDM.

Both OFDM symbols C64 (see FIG. 1) of the C-preamble in a multicarrier system are used for a channel estimation. Prior to the actual channel estimation, the two OFDM symbols C64 are added to obtain a higher noise suppression. Then, a phase is estimated for the added OFDM symbols C64 which is defined to be a reference phase. Assuming a constant frequency offset, the phase offset of the first data symbol of the OFDM data stream is estimated with respect to the estimated reference phase of the C-preamble symbols. Further, on the basis of the estimated reference phase of the C-preamble symbols C64, the derotating phase for the first data symbol is calculated. Here, the derotating phase corresponds to a phase offset predicted for the beginning of the following OFDM data symbol. This procedure exhibits a predictive character for frequency offsets of data symbols to be corrected.

The present technology also provides a method for frequency correction in a multicarrier system and a respective apparatus.

For the example method, a signal comprising a stream of data signals is received and an estimated phase offset is calculated for each data signal as a function of the respective data signal. Further, as a function of the estimated phase offset of a data signal and the estimated phase offset of a data signal preceding the latter data signal, a predicted phase offset is calculated for the data signal in question. In order to perform a frequency correction of the received signal, a phase correction is performed for each data signal in dependence of the corresponding predicted phase offset.

Due to the double integration property of a second order phase locked loop, it is possible to calculate the predicted phase offset further as a function of the predicted phase offset(s) of one or two proceeding data signals.

In particular, the frequency and phase correction of the received signal is performed on the basis of a phase correction offset for each data signal. The phase correction offset of each data signal is calculated as a function of the predicted phase offset of a preceding data signal, whereby the phase correction of each data signal can be performed as a function of the respective phase correction offset.

A further improvement can be achieved, if each data signal is separated into at least two data signal samples. For each of the data signal samples, a predicted sample phase offset is calculated as a function of the predicted phase offset for the data signal comprising the data signal samples in question.

As a result, it is possible to correct each data signal by a further phase correction of each of the respective data signal samples. Here, the phase correcting of the data signal samples is performed in dependence of the respective predicted sample phase offset of the data signal sample to be corrected.

Preferably, each data signal is separated into its data signal samples such that, in the time domain, the first data signal sample corresponds with the beginning of the data signal comprising the same.

Comparable to the above phase correction offset, it is contemplated to calculate a sample phase correction offset for each data signal sample. In particular, the sample phase correction offset is obtained by a function being indicative of the position of the data signal sample in question within the respective sequence of data signal samples in the time domain. Thus, an improved phase correction offset for each data signal is obtained by including the above phase correction offset and a respective one of the sample phase correction offsets.

In order to consider distances between the data signals and, specifically, of the data signal samples in the time domain, each predicted sample phase offset can be calculated as a function of the respective predicted phase offset of the corresponding data signal (i.e. the data signal including the data signal sample in question) and a distance measure. In particular, this measure is indicative, in the time domain, of a distance between a main phase reference point for the received signal and a phase reference point for a data signal preceding the data signal for which the predicted sample phase offsets are currently calculated.

In case, the received signal comprises a preamble signal proceeding the stream of data signals (e.g. the two OFDM C-preamble symbols), an estimated reference phase for the preamble signal is calculated as a function thereof. As a result, it is possible to calculate the estimated phase offset for a data signal subsequently following the preamble signal as a function of this data signal and the estimated reference phase for the preamble signal.

Here, the main phase reference point can be defined to be indicative of the middle of the preamble signal in the time domain. In case of the OFDM, this is achieved by the above described addition of the two OFDM C-preamble symbols. Further, it is possible to define the phase reference point for the data signals to be indicative of the beginning of the data signals in the time domain.

In order to provide data/information for a frequency correction for the first data signal following the preamble signal, the phase reference point for the first data signal can be defined to be indicative of its middle in the time domain.

Moreover, the present technology provides an apparatus for frequency correction in a multicarrier system. This apparatus comprises a receiving means for receiving a signal comprising a stream of data signals, a frequency correction means for correction of the data signals in response to a corresponding predicted phase offset, and a phase locked loop means. The phase locked loop means comprises a phase discrimination means for generating an estimated phase offset for each data signal as a function thereof and a filter means for receiving the estimated phase offsets. In dependence of the received estimated phase offsets, the filter means generates predicted phase offsets for each data signal which are employed to frequency correct the stream of data signals.

Further features of the apparatus are defined in the dependent claims. In particular, it is preferred that the apparatus is operated according to one of the above described methods for a frequency correction of signals in a multicarrier system.

Moreoever, the present technology provides a transceiver for wireless communication including, at least, the apparatus according to the invention, or an embodiment thereof. Also, a transceiver for wireless communication is contemplated which is capable of being operated and/or controlled by means of one of the above described methods according to the invention.

BRIEF DESCRIPTION OF THE FIGURES

In the following description of preferred embodiments it is referred to the accompanying figures, wherein.

DESCRIPTION OF PREFERRED EMBODIMENTS

Although the present invention can be used in any multicarrier system wherein a channel estimation in the demodulation process of received signals is performed, the following description of preferred embodiments is exemplary set forth with respect to a multicarrier system employing OFDM.

Figure 2:
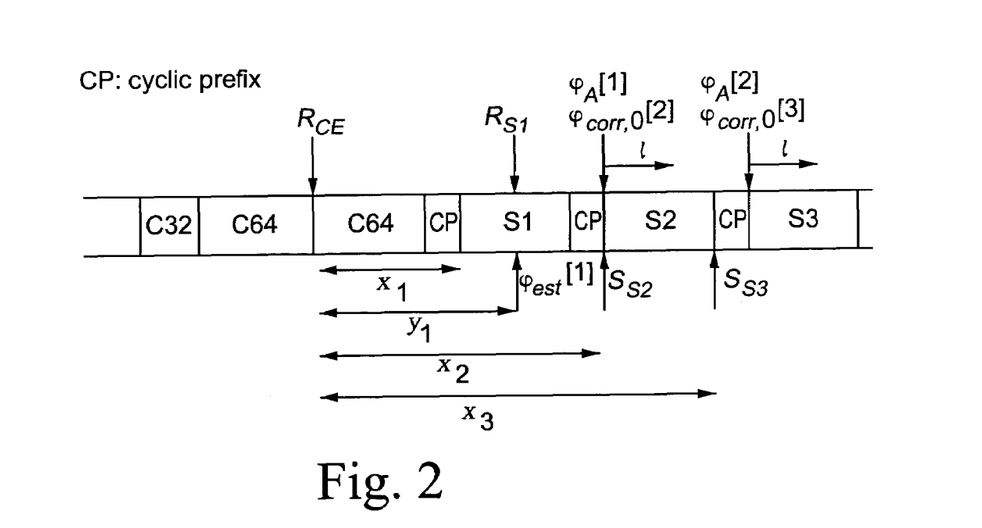
FIG. 2 illustrates the structure of a received data signal stream including phase reference points and estimated and predicted phase offsets according to an example embodiment.

FIG. 2 illustrates the structure of a received sample stream including the phase reference points of a frequency tracker according to an example embodiment and the channel estimation (phase offset estimation) according to an example embodiment. The OFDM symbols C64 of the C-preamble are used for a channel estimation and a reference phase estimation, respectively. Prior to the actual channel estimation, the two C-preamble symbols are added to obtain a higher noise suppression. As a result of this averaging process, the phase reference point of the channel estimation $R_{CE}$ is positioned in the middle of the OFDM symbols C64 in the time domain. The actual data stream of data signals (i.e. OFDM symbols) follows the C-preamble. In the following the actual data stream is also called burst, wherein every burst comprises several OFDM symbols preceded by a C-preamble.

The frequency tracker, which is explained in detail below, estimates the phase offset of the first data OFDM symbol S1. Assuming a constant frequency offset, the estimated phase offset $\phi_{est}[1]$ corresponds to the phase offset in the middle $R_{S1}$ of the OFDM symbol S1 in the time domain. The difference between the reference points $R_{CE}$ and $R_{S1}$ in the time domain is denoted by $y_1$ in FIG. 2. On the basis of the phase offset $\phi_{est}[1]$, the frequency tracker calculates the derotating phase $\phi_{corr,0}[2]$.

The derotating phase $\phi_{corr,0}[2]$ corresponds with a phase offset $\phi_A[1]$ at the beginning $S_{S2}$ of the second OFDM symbol S2. This phase offset $\phi_A[1]$ is a predicted phase offset for the second OFDM symbol S2. In the time domain, the differences between the reference point $R_{CE}$ and the beginning Sk of the OFDM symbols constituting a phase reference point for each OFDM symbol Sk is denoted by $x_k$.

As explained in the following, the parameters $x_k$ and $y_1$ are used to determine the optimum coefficients for the phase locked loop of the frequency tracker. Further, it is noted that the so-called predicted phase offset $\phi_A[k-1]$ represents the phase increment from the phase reference point $R_{ce}$ of the C-preamble to the beginning $S_{Sk}$ of the k-th OFDM symbol Sk. The phase correction offset $\phi_{corr,l}[k]$ represents the phase increment from the phase reference point $R_{ce}$ to the l-th sample of the k-th OFDM symbol Sk.

As an option, it is possible to derotate the samples of a burst at the beginning $S_{S1}$ of a first OFDM symbol S1. Here, it is necessary to estimate the phase offset of the second OFDM symbol in the C-preamble as described above with respect to the first data symbol S1. Thus, the frequency correction for the first OFDM symbol S1 can be improved. It should be noted, that in this case the second OFDM symbol within the C-preamble has to be separately transformed in the frequency domain.

Figure 3:
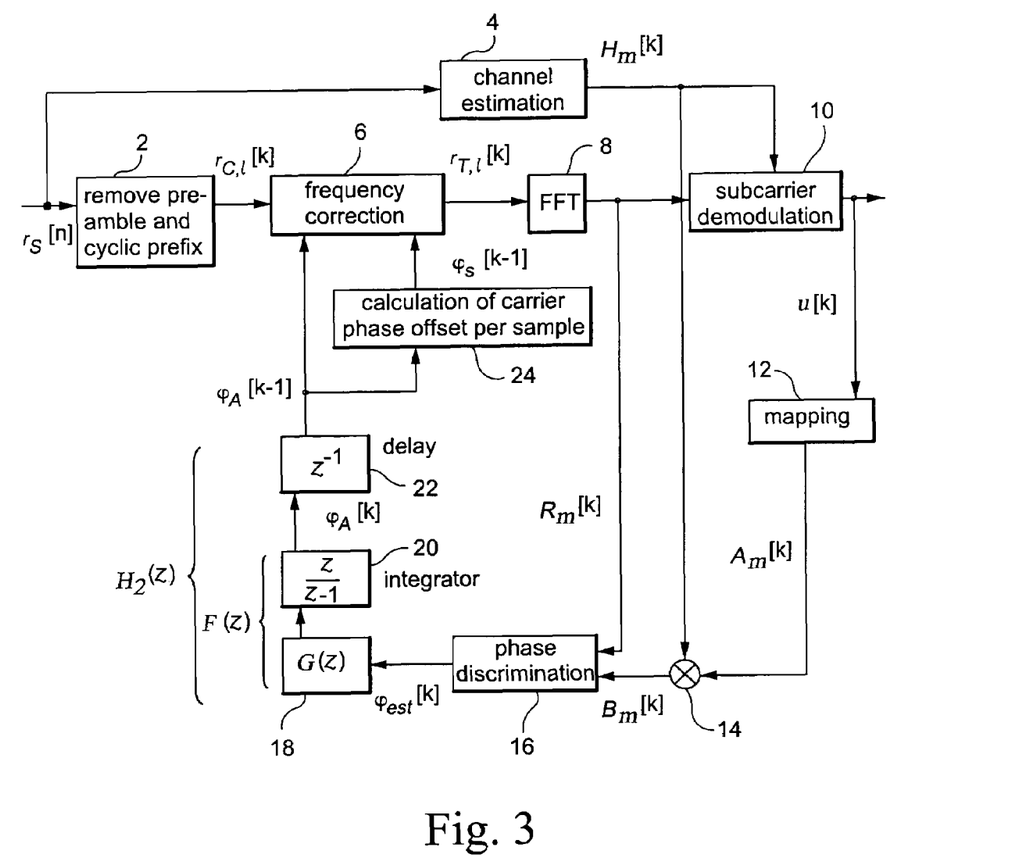
FIG. 3 illustrates a frequency correction apparatus according to an example embodiment.

Referring to FIG. 3, an embodiment of the above mentioned frequency tracker employing a decision directing digital phase locked loop is explained.

As shown in FIG. 3, a signal $r_s[n]$ in a OFDM multicarrier system is received, wherein "n" indicates the number of subcarriers. In a means 2, the C-preamble and the cyclic prefix (see FIG. 1) is removed to obtain a sample stream $r_{c,l}[k]$. The sample stream $r_{c,l}[k]$ is the OFDM symbol stream before a frequency correction is performed.

Here, the index "k" indicates the number of symbols in a burst, while the index "C" is used to distinguish the signals. As explained in the following, the index "l" represents the number of the samples derived for each OFDM symbol.

The C-preamble of the received OFDM signal $r_s[n]$ is transferred to a channel estimation means 4 to provide values being indicative of the channel estimation $H_m[k]$ of each subcarrier, in a known manner.

To obtain a frequency corrected signal $r_{T,l}[k]$, the symbol stream $r_{c,l}[k]$ is computed by a frequency correction means 6. Here, the index "T" is used to distinguish the signals.

The frequency corrected symbol stream $r_{T,l}[k]$ is further computed by a fast fourier transformation means 8 and a subcarrier demodulation means 10 as known in the state of the art to provide demodulated signals.

The output u[k] of the subcarrier demodulator 10 are remodulated by a means 12 to obtain the remodulated symbols $A_m[k]$. The means 12 perform the remodulation of the output u[k] by a mapping performed according to the HIPERLAN/2 standard. The remodulated symbols $A_m[k]$ are multiplicated by a means 14 with the above values of the channel estimation $H_m[k]$ of each subcarrier according to the following equation to obtain a weighted symbol estimation $B_m[k]$ on each subcarrier $$B_m[k]=A_m[k]\ P\ H_m[k] \quad (1)$$

wherein "m" denotes the number of subcarriers.

The phase discrimination between received signal samples $R_m[k]$ and the weighted symbol estimation $B_m[k]$ yields the phase estimation $\phi_{est}[k]$ outputted by a means 16. The phase estimation $\phi_{est}[k]$ is further computed by a filter F(z) comprising a first order loop filter 18 having the transfer function:

$$G(z) = \frac{a \cdot z + b}{(z-1)}, \quad (2)$$

and an integrator 20 having the transfer function:

$$F(z) = z \cdot \frac{a \cdot z + b}{(z-1)^2}. \quad (3)$$

The following equation defines a calculation of the output of the filter F(z):

$$\phi_A[k]=a\cdot\phi_{est}[k]+b\cdot\phi_{est}[k-1]+2\cdot\phi_A[k-1]-\phi_A[k-2] \quad (4)$$

wherein $\phi_A[0]$ and $\phi_A[-1]$ are set to be zero for initialization purposes.

The output $\phi_A[k-1]$ representing the phase increment from the phase reference point $R_{ce}$ of the C-preamble to the beginning $S_{Sk}$ of the k-th OFDM symbol Sk is forwarded to a delay 22. Thus, a filter $H_2[z]$ being of a second order type is obtained, wherein the transfer function of the filter $H_2[z]$ as open loop is described by:

$$H_2(z) = \frac{a \cdot z + b}{(z-1)^2}. \quad (5)$$

As described above, the output $\phi_A[k-1]$ of the filter F(z) corresponds with the phase which would be existent in the k-th OFDM symbol Sk if no frequency tracking was applied for a received OFDM signal exhibiting a low noise.

For the sake of simplicity, in the following, a constant frequency offset is assumed. However, the following derivation is still valid when the constant frequency offset corresponds to the mean frequency offset over a certain time, which is typical one OFDM symbol, in case of a varying frequency offset e.g. due to phase noise. As a result, the phase offset $\phi_s[k]$ per signal sample outputted by a means 24 is given by:

$$\varphi_s[k] = \frac{\varphi_A[k]}{x_{k+1}}. \quad (6)$$

Since the phase $\phi_A[k]$ represents a predicted phase offset for a respective OFDM symbol, the sample phase offset $\phi_S[k]$ is also a predicted phase offset since it is calculated as a function of the phase $\phi_A[k]$. In order to take in account the underlying predictive property, the sample phase offset $\phi_S[k]$ is obtained by a division of the phase offset $\phi_A[k]$ by the number $X_{k+1}$ of samples between the reference point $R_{CE}$ and the beginning $S_{S_{K+1}}$ in the time domain, of the OFDM symbol Sk+1 comprising the samples in question.

The predicted phase offset $\phi_A[k]$ and the predicted sample phase offset $\phi_s[k]$ are transferred to the frequency correction means 6, which, in response, preforms the frequency and phase correction according to the following equation:

$$r_{T,l}[k] = r_{C,l}[k] \cdot \exp(-j \cdot \phi_{corr,l}[k]) \quad (7)$$

wherein $$\phi_{corr,l}[k] = \phi_A[k-1] + \phi_S[k-1] \cdot | \quad (8)$$

Referring back to the above described filter $H_2(z)$, the parameters "a" and "b" characterize the noise suppression and the acquisition time of the phase locked loop filter. This filter coefficients can be calculated according to the following equations wherein the values used for the calculation are defined with respect to an OFDM signal according to the HIPERLAN/2 standard.

The predicted phase offset $\phi_A[1]$ for the second OFDM data symbol is calculated with equation (4) to be:

$$\phi_A[1] = a \cdot \phi_{est}[1] \quad (9)$$

In order to obtain an optimum acquisition performance, the ratio of the predicted phase $\phi_A[1]$ and the respective estimated phase offset $\phi_{est}[1]$ is defined to be equal to the ratio of the distance between the second OFDM data symbol S2 and the reference point $R_{CE}$ (see FIG. 2):

$$\frac{\varphi_A[1]}{\varphi_{est}[1]} = a = \frac{x_2}{y_1}. \quad (10)$$

This exact prediction of the phase offset $\phi_A[1]$ provides, assuming $Y_1=112$ and $x_2=160$ according to the HIPERLAN/2 standard, the parameter "a" to be:

$$a = \frac{160}{112} = 1.43. \quad (11)$$

Applying equations (4) and (9), the predicted phase offset $\phi_A[2]$ for the third OFDM symbol S3 is given by:

$$\phi_A[2] = a \cdot \phi_{est}[2] + b \cdot \phi_{est}[1] + 2a \cdot \phi_{est}[1] \quad (12)$$

In case, the frequency offset is ideally corrected after the first correction step (i.e. k=1) the estimated phase offset $\phi_{est}[2]$ is 0. As a result, the second predicted phase offset $\phi_A[2]$ is given by:

$$\phi_A[2] = b \cdot \phi_{est}[1] + 2a \cdot \phi_{est}[1] \quad (13)$$

whereby the ratio thereof and the first estimated phase offset $\phi_{est}[1]$ is given by:

$$\frac{\varphi_A[2]}{\varphi_{est}[1]} = b + 2a = \frac{x_3}{y_1}. \quad (14)$$

This calculation again provides an exact prediction of the phase offset $\phi_A[2]$. Assuming $x_3=240$ according to the HIPERLAN/2 standard, the filter coefficient "b" is given by:

$$b = \frac{x_3 - 2x_2}{y_1} = \frac{-80}{112} = -0.714. \quad (15)$$

Assuming a frequency offset ideally corrected after each step and, consequently, estimated phase offsets $\phi_{est}[k]=0$, the predicted phase offset $\phi_A[k]$ for each OFDM data symbol is given by:

$$\phi_A[k] = \phi_{est}[1](k \cdot a + (k-1) \cdot b) \quad (16)$$

According to the equation (6) the predicted sample phase offsets $\phi_S[k]$ are calculated as follows:

$$\varphi_S[k] = \frac{\varphi_A[k]}{x_{k+1}} = \frac{\varphi_A[k]}{x_1 \cdot (k+1)} = \frac{\varphi_A[k]}{80 \cdot (k+1)}. \quad (17)$$

Assuming an ideal frequency correction, the predicted phase offsets $\phi_S[k]$ can be easily derived on the basis on the following equation (18):

$$\varphi_S = \frac{\varphi_{est}[1]}{80} \cdot \frac{k \cdot a + (k-1) \cdot b}{(k+1)}. \quad (18)$$

Figure 4:
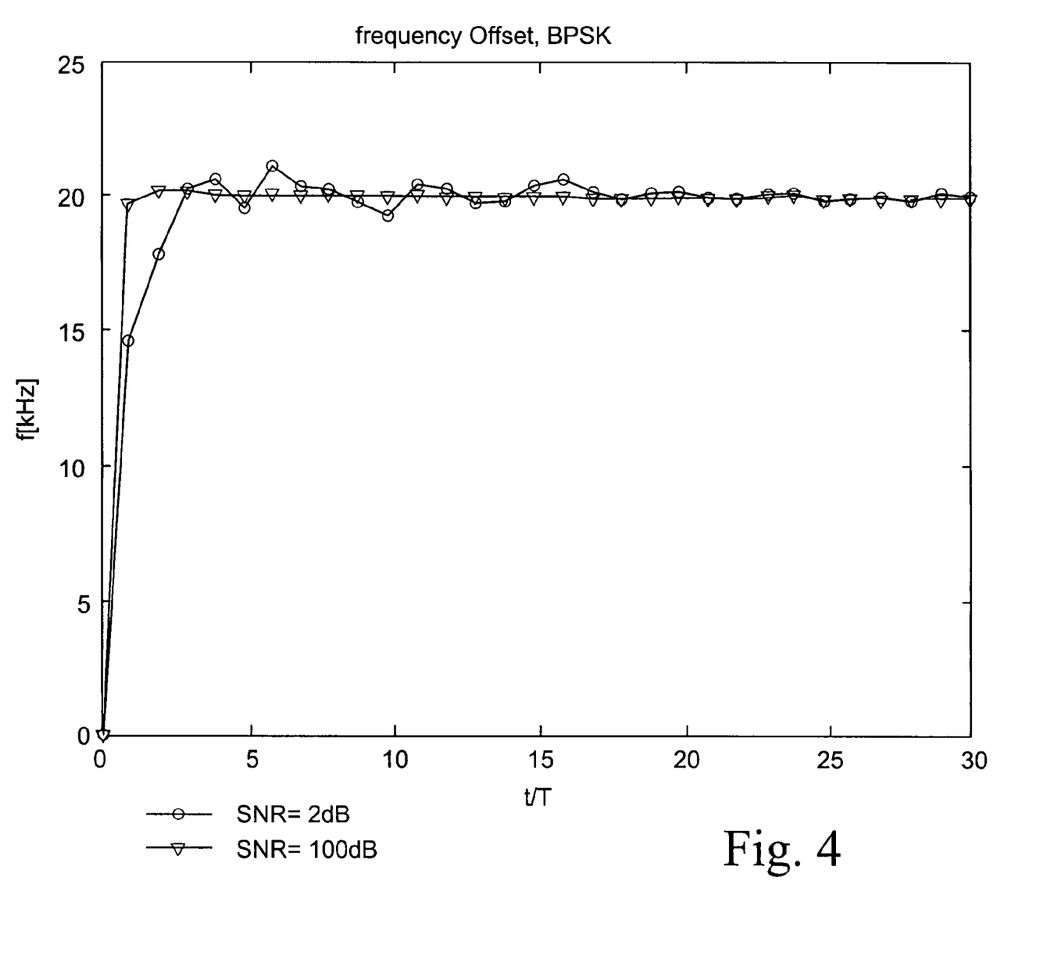
FIG. 4 shows a diagram for frequency offsets for signals having different signal-to-noise ratios estimated according to an example embodiment.

As an example, FIG. 4 illustrates the frequency offsets estimated for a signal having a low signal-to-noise-ratio (SNR) and a signal having a high SNR. In both cases, the initial frequency offset is 20 kHz. As shown in FIG. 4, the frequency tracker of FIG. 3 performs a fast frequency correction for the signal having the high SNR leading to a fast acquisition. Compared thereto, the acquisition for the signal having the low SNR is lower due to decision errors with respect to the frequency offset estimation for the first steps. In order to overcome effects impairing the frequency correction, e.g. due to high initial frequency offsets and very low SNR's, it is contemplated to use a decoding and recoding procedure being performed downstream the subcarrier demodulation means 10 of FIG. 3. Here it is possible that the output u[k] of the subcarrier demodulation means 10 are first decoded and subsequently recoded before being remodulated to obtain the symbols $A_m[k]$.

The invention claimed is:

1. A method for frequency correction in a multicarrier system, comprising:
    receiving a signal comprising a stream of data signals, wherein at least one of the data signals comprises at least two data signal samples,
    calculating an estimated phase offset for each data signal as a function thereof,
    calculating a predicted phase offset for each data signal as a function of the estimated phase offset thereof and the estimated phase offset of a preceding one of the data signals such that the ratio of the calculated predicted phase offset of each data signal and the estimated phase offset of a first data signal of said stream substantially equals the ratio of a distance ($X_{k+1}$) between a beginning of a following one of the data signals and a main phase reference point and a distance ($Y_l$) between a phase reference point of the first data signal and the main reference point, said distances ($X_{k+1}$, $Y_l$) being indicative of a number of data signal samples in the time-domain, and
    correcting the received signal using the predicted phase offset.

2. The method according to claim 1, comprising:
    calculating the predicted phase offset further as a function of the predicted phase offset of the preceding one of the data signals, or calculating the predicted phase offset further as a function of the predicted phase offset of the preceding one of the data signals and the predicted phase offset of one of the data signals preceding the preceding one of the data signals.

3. The method according to claim 1, comprising:
calculating a phase correction offset for each data signal as a function of the predicted phase offset of the preceding one of the data signals, and
correcting each data signal as a function of the phase correction offset thereof.

4. The method according to claim 1, comprising:
separating each data signal in at least two data signal samples,
calculating a predicted sample phase offset for each of said data signal samples as a function of the predicted phase offset of a corresponding one of the data signals, and
correcting the phase of each data signal further by correcting a phase of each of the data signal samples as a function of a respective one of the predicted sample phase offsets.

5. The method according to claim 4, comprising:
separating each data signal ($r_{C,i}[k]$) such that a first of the data signal samples ($r_{C,i}[k]$) represents the beginning of the corresponding one of the data signals ($r_{C,i}[k]$).

6. The method of claim 4 comprising:
calculating a sample phase correction offset for each of the data signal samples as a function of the predicted sample phase offset and the predicted phase offset of the corresponding one of the data signal, and
correcting the phase of each data signal by correcting the phase of each of the data signal samples thereof as a function of a corresponding one of the phase correction offsets and a corresponding one of the sample phase correction offsets.

7. The method of claim 4, comprising:
calculating each predicted sample offset as a function of the predicted phase offset of the corresponding one of the data signals and a measure being indicative of a distance ($x_{k+1}$) between a main phase reference point for the received signal and a phase reference point for the preceding one of the data signals.

8. The method of claim 1, comprising:
receiving a preamble signal preceding the data signals,
calculating an estimated phase arc as a function of the preamble signal, and
calculating the estimated phase offset of the data signal subsequent the preamble signal as a function thereof and the estimated phase arc.

9. The method of claim 7, comprising:
defining the main phase reference point to be indicative of the middle of the preamble signal in the time domain, and/or
defining the phase reference points to be indicative of the beginning of the corresponding data signal in the time domain.

10. The method according to claim 9, comprising:
defining a phase reference point for the data signal subsequent the preamble signal to be indicative of the middle of the subsequent data signal in the time domain.

11. The method according to claim 4, comprising:
separating each data signal in the data signal samples by means of sampling the received signal or each data signal.

12. The method according to claim 1, comprising:
receiving an orthogonal frequency division multiplex signal as the received signal, wherein a stream of symbols thereof represent the stream of data signals, and at least one preamble symbol thereof represent the preamble signal.

13. An apparatus for frequency correction in a multicarrier system, comprising:
a receiver configured to receive a signal comprising a stream of data signals, at least one of the data signals comprising at least two data signal samples,
a frequency corrector configured to perform frequency correction of each data signal in response to a corresponding predicted phase offset, and
a phase locked loop (6, . . . 24) configured to generate the predicted phase offsets, comprising
a phase discriminator (12, 14, 16) configured to generate an estimated phase offset for each data signal as a function thereof,
a filter (18, 20, 22) configured to receive estimates phase offsets and to generate the predicted phase offset for each data signal as a function of the estimated phase offset thereof and the estimated phase offset of a preceding one of the data signals, wherein the filter is adapted to generate the predicted phase offset of each data signal such that a ratio of the generated predicted phase offset of each data signal and the estimated phase offset of the first data signal of said stream substantially equals a ratio of a distance ($X_{k+1}$) between a beginning of a following one of the data signals and a main phase reference point and a distance ($Y_i$) between a reference point of the first data signal and the main reference point, said distances ($X_{k-1}$, $Y_i$) being indicative of a number of data signal samples in the time domain.

14. The apparatus according to claim 13, wherein:
the filter comprises a first order loop filter configured to receive the estimated phase offsets and an integrator for receiving outputs of the first order loop filter.

15. The apparatus according to claim 14, further comprising:
a delay device configured to receive outputs of the integrator.

16. The apparatus according to claim 13, further comprising:
a calculator configured to calculate predicted sample phase offsets in response to the predicted phase offsets.

17. The apparatus according to claim 16, wherein:
the calculator is coupled to the filter.

18. The apparatus according to claim 17 wherein:
the calculator is coupled to the delay device.

19. The apparatus according to claim 13, wherein:
the frequency corrector is coupled to the filter and the calculator.

20. The apparatus according to claim 13, wherein:
the frequency corrector and the filter are adapted to be operated according to the method of claim 1.

21. A transceiver for wireless communication, comprising the apparatus according to claim 13.

22. A transceiver for wireless communication, adapted to be operated by the method according to claim 1.

23. The apparatus according to claim 13, wherein
said filter comprises a first filter coefficient being indicative of noise suppression, the first filter coefficient being defined to substantially satisfy the equation $$a = X_2/Y_1,$$

wherein a is a first filter coefficient, $X_2$ is a distance between the beginning of a second data signal of said stream and the main phase reference point, and $Y_1$ is a distance between the reference point of the first data signal of said stream and the main reference point, said distances $(X_2, Y_1)$ being indicative of the number of data signal samples in the time domain.

24. The apparatus according to claim 23, wherein a is substantially 1.43.

25. The apparatus according to claim 13, wherein said filter comprises a second filter coefficient being indicative of the filter's acquisition time, the second filter coefficient being defined to substantially satisfy the equation $$b=(X_3-2*X_2)/Y_1,$$

wherein b is a second filter coefficient, $X_3$ is a distance between the beginning of a third data signal of said stream and the main phase reference point, $X_2$ is a distance between a beginning of the second data signal of said stream and the main phase reference point, and $Y_1$ is a distance between the reference point of the first data signal of said stream and the main reference point, said distances $(X_2, X_3, Y_1)$ being indicative of the number of data signal samples in the time domain.

26. The apparatus according to claim 25, wherein b is substantially −0.714.

27. The apparatus according to claim 13, wherein said filter comprises a first filter coefficient and a second filter coefficient being indicative of noise suppression and the filter's acquisition time, the first and the second filter coefficients being defined to substantially satisfy the equations $$a=X_2/Y_1, \text{ and}$$

$$b=(X_3-2*X_2)/Y_1,$$

wherein a is a first filter coefficient and b is a second filter coefficient, $X_3$ is a distance between a beginning of a third data signal of said stream and the main phase reference point, $X_2$ is a distance between a beginning of a second data signal of said stream and the main phase reference point, and $Y_1$ is a distance between the reference point of the first data signal of said stream and the main reference point, said distances $(X_2, X_3, Y_1)$ being indicative of the number of data signal samples in the time domain.

28. The apparatus according to claim 27, wherein a is substantially 1.43 and b is substantially −0.714.

29. The apparatus according to claim 13, wherein said apparatus is adapted to receive and frequency correct an orthogonal frequency division multiplex (OFDM) signal comprising a stream of data signals.

30. The apparatus according to claim 29, wherein said orthogonal frequency division multiplex (OFDM) signal further comprises at least one preamble symbol thereof representing a preamble signal.

31. The apparatus according to claim 30, wherein the main phase reference point is indicative of the middle of the preamble signal in the time domain.

32. The apparatus according to claim 13, wherein the phase reference point of the first data signal is indicative of the beginning of the first data signal in the time domain.

33. The apparatus according to claim 30, wherein the phase reference point of the first data signal is indicative of a middle of the first data signal subsequent the preamble signal in the time domain.

34. The method according to claim 1, further comprising correcting the received signal by correcting a phase of each data signal as a function of the predicted phase offset thereof.

* * * * *

UNITED STATES PATENT AND TRADEMARK OFFICE
CERTIFICATE OF CORRECTION

PATENT NO. : 7,324,599 B2
APPLICATION NO. : 10/751120
DATED : January 29, 2008
INVENTOR(S) : Frank et al.

It is certified that error appears in the above-identified patent and that said Letters Patent is hereby corrected as shown below:

In Column 10, Line 33, in Claim 13, delete "$(X_{k-1},$" and insert -- $(X_{k+1},$ --, therefor.

Signed and Sealed this

Thirtieth Day of September, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,324,599 B2 | Page 1 of 1 |
| APPLICATION NO. | : 10/751120 | |
| DATED | : January 29, 2008 | |
| INVENTOR(S) | : G. Frank et al. | |

It is certified that error appears in the above-identified patent and that said Letters Patent is hereby corrected as shown below:

Title page, Item (63) change "July 4, 2002" to --May 22, 2002--.

Signed and Sealed this

Sixth Day of July, 2010

David J. Kappos
*Director of the United States Patent and Trademark Office*